(12) United States Patent
Jiang et al.

(10) Patent No.: US 10,714,983 B2
(45) Date of Patent: Jul. 14, 2020

(54) NEAR-FIELD MICROWAVE WIRELESS POWER SYSTEM

(71) Applicant: Apple Inc., Cupertino, CA (US)

(72) Inventors: Bing Jiang, Fremont, CA (US); Martin Schauer, Fremont, CA (US); Indranil S. Sen, Cupertino, CA (US); Jouya Jadidian, Saratoga, CA (US); Mark D. Neumann, El Granada, CA (US); Mohit Narang, Cupertino, CA (US); Vaneet Pathak, Los Altos, CA (US); Yi Jiang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 15/902,875

(22) Filed: Feb. 22, 2018

(65) Prior Publication Data

US 2019/0199137 A1 Jun. 27, 2019

Related U.S. Application Data

(60) Provisional application No. 62/609,131, filed on Dec. 21, 2017.

(51) Int. Cl.
*H02J 50/12* (2016.01)
*H02J 50/23* (2016.01)
(Continued)

(52) U.S. Cl.
CPC ............ *H02J 50/23* (2016.02); *H01Q 9/0407* (2013.01); *H01Q 21/065* (2013.01); *H02J 50/10* (2016.02);
(Continued)

(58) Field of Classification Search
CPC .. H02J 50/12; H02J 50/23; H02J 50/10; H02J 50/80; H01Q 21/065; H01Q 9/0407; H04B 5/0037
See application file for complete search history.

(56) References Cited

U.S. PATENT DOCUMENTS 9,209,627 B2    12/2015   Baarman et al.
9,991,731 B2 *   6/2018   Ichikawa ............... H02J 7/025
(Continued)

FOREIGN PATENT DOCUMENTS

CN     102946154 A       2/2013
KR   1020170128052 A    11/2017

*Primary Examiner* — Alfonso Perez Borroto
*Assistant Examiner* — Esayas G Yeshaw
(74) *Attorney, Agent, or Firm* — Treyz Law Group, P.C.; George Victor Treyz; Jason Tsai

(57) ABSTRACT

A wireless power system may use a wireless power transmitting device to transmit wireless power to a wireless power receiving device. The wireless power transmitting device may have microwave antennas that extend along an axis in a staggered arrangement. In the staggered arrangement, the microwave antennas are positioned on alternating sides of the axis. Each microwave antenna is elongated along a dimension that is perpendicular to the axis. Multiple antennas may overlap a wireless power receiving antenna in the wireless power receiving device. Control circuitry may use oscillator and amplifier circuitry to provide antennas that have been overlapped by the wireless power receiving antenna with drive signals. The drive signals may be adjusted based on feedback from the wireless power receiving device to enhance power transmission efficiency. The system may have a wireless power transmitting device with inductive wireless power transmitting coils.

20 Claims, 8 Drawing Sheets

(51) Int. Cl.
  *H02J 50/10*   (2016.01)
  *H01Q 9/04*    (2006.01)
  *H01Q 21/06*   (2006.01)
  *H04B 5/00*    (2006.01)
  *H02J 50/80*   (2016.01)

(52) U.S. Cl.
  CPC ............ *H02J 50/12* (2016.02); *H04B 5/0037* (2013.01); *H02J 50/80* (2016.02)

(56) References Cited

U.S. PATENT DOCUMENTS

| | | | |
|---|---|---|---|
| 2009/0096413 A1 | 4/2009 | Partovi et al. | |
| 2014/0292428 A1* | 10/2014 | Koyama | H03B 7/08 |
| | | | 331/107 T |
| 2015/0028694 A1 | 1/2015 | Leabman et al. | |
| 2015/0115733 A1* | 4/2015 | Sealy | H02J 50/12 |
| | | | 307/104 |
| 2016/0211704 A1* | 7/2016 | Uchida | H02J 50/40 |
| 2017/0033609 A1* | 2/2017 | Nakamura | H02J 5/005 |
| 2017/0201118 A1* | 7/2017 | Nejatali | H02J 7/025 |
| 2017/0372836 A1* | 12/2017 | Jeong | H02J 50/12 |
| 2018/0201370 A1* | 7/2018 | Yang | B64C 39/024 |
| 2018/0269570 A1* | 9/2018 | Hosseini | H02J 7/025 |

\* cited by examiner

NEAR-FIELD MICROWAVE WIRELESS POWER SYSTEM

This application claims the benefit of provisional patent application No. 62/609,131, filed Dec. 21, 2017, which is hereby incorporated by reference herein in its entirety.

FIELD

This relates generally to power systems, and, more particularly, to wireless power systems for charging electronic devices.

BACKGROUND

In wireless charging systems, wireless power transmitting devices transmit power wirelessly to wireless power receiving devices. In some configurations, wireless power transmitting devices such as wireless charging mats are able to transmit power wirelessly to a variety of different wireless power receiving devices. The wireless power receiving devices each have rectifier circuitry for receiving wireless alternating-current (AC) power from the wireless charging mat. The rectifier circuitry is used in converting the received AC power into direct-current (DC) power.

SUMMARY

A wireless power system may use a wireless power transmitting device to transmit wireless power to a wireless power receiving device. The wireless power transmitting device has antennas such as patch antennas. The patch antennas are arranged in a staggered row that extends along an axis. Each patch antenna is elongated along a dimension that is perpendicular to the axis.

Multiple antennas may be coupled to a wireless power receiving antenna in the wireless power receiving device. Control circuitry in the wireless power transmitting device uses oscillator and amplifier circuitry to provide antennas that have been overlapped by the wireless power receiving antenna with drive signals. The drive signals are adjusted based on feedback from the wireless power receiving device to enhance power transmission efficiency. For example, drive signals provided to different antennas can be provided with different phases and/or magnitudes to enhance power transmission efficiency.

In some arrangements, the wireless power transmitting device includes inductive charging circuitry with one or more wireless power transmitting coils. Each coil may have loops of wire that surround a corresponding patch antenna resonating element. To suppress eddy currents that might otherwise be induced in the patch antenna resonating element during inductive wireless power transmission operations, the patch antenna resonating elements may each have one or more slots.

DETAILED DESCRIPTION

A wireless power system has a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device has an array of wireless power transmitting antennas arranged across a charging surface. During operation, the wireless power transmitting antennas such as microwave antennas are used to transmit wireless power signals that are received by a near-field-coupled wireless power receiving antenna in the wireless power receiving device.

Figure 1:
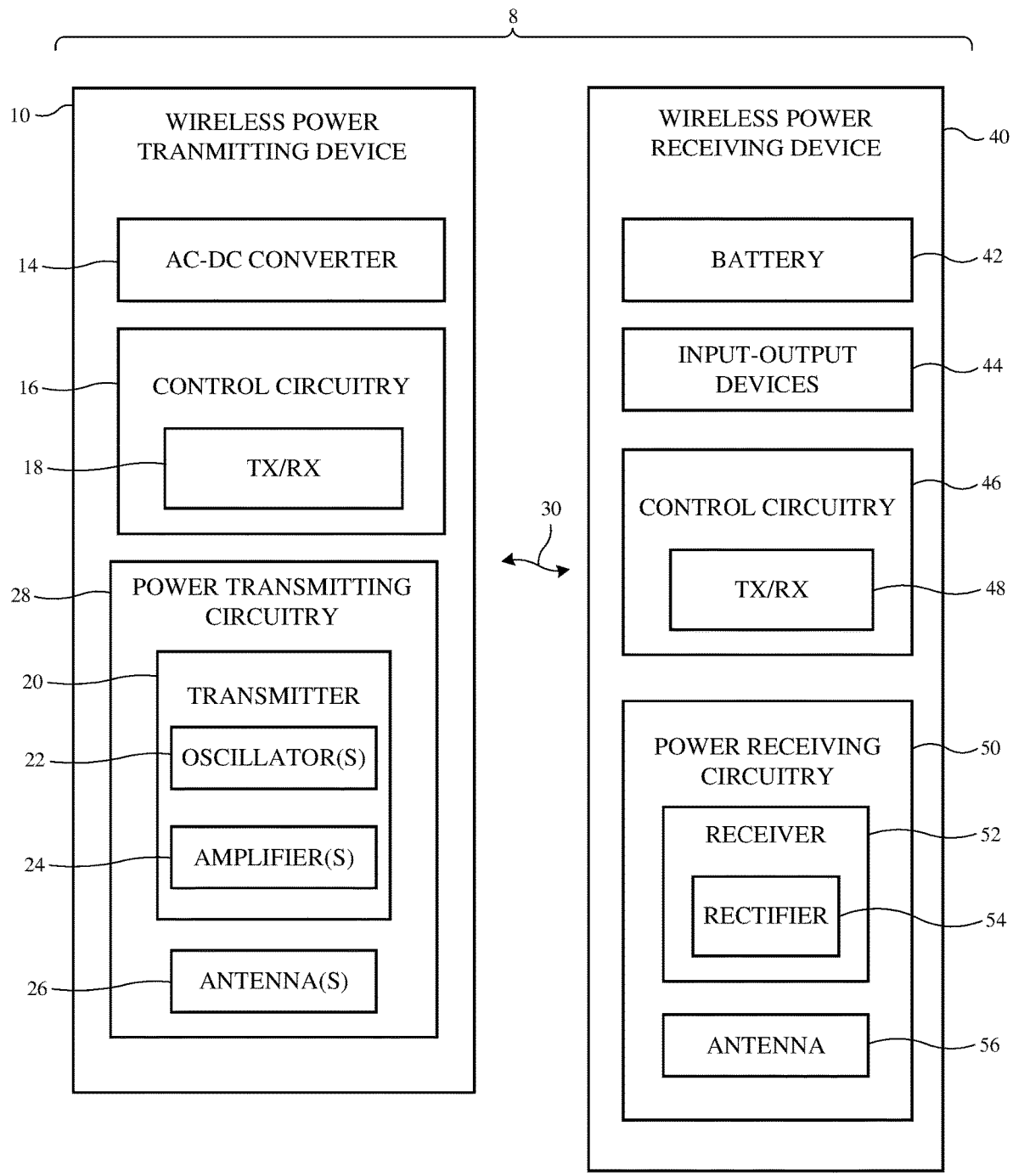
FIG. 1 is a schematic diagram of an illustrative wireless power system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 10 and includes a wireless power receiving device such as wireless power receiving device 40. Wireless power transmitting device 10 includes control circuitry 16. Wireless power receiving device 40 includes control circuitry 46. Control circuitry in system 8 such as control circuitry 16 and control circuitry 46 is used in controlling the operation of system 8. This control circuitry includes processing circuitry associated with microprocessors, power management units, baseband processors, digital signal processors, microcontrollers, and/or application-specific integrated circuits with processing circuits. The processing circuitry implements desired control and communications features in devices 10 and 40. For example, the processing circuitry may be used in determining power transmission levels, processing sensor data, processing user input, handling communications between devices 10 and 40 (e.g., sending and receiving data associated with wireless power transfer operating settings), selecting wireless power transmitting antennas, adjusting the phase and/or magnitude of drive signals applied to each transmitting antenna, and otherwise controlling the operation of system 8.

Control circuitry in system 8 may be used to authorize power receiving devices to use power and ensure that authorized power receiving devices do not exceed maximum allowable power consumption levels. Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 16 and/or 46. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 46. The processing circuitry may include application-specific integrated circuits with processing circuitry, one or more microprocessors, a central processing unit (CPU) or other processing circuitry.

Power transmitting device 10 may be a stand-alone power adapter (e.g., a wireless charging mat that includes power adapter circuitry), may be a wireless charging mat that is connected to a power adapter or other equipment by a cable, may be a portable device, may be equipment that has been incorporated into furniture, a vehicle, or other system, or may be other wireless power transfer equipment. Illustrative configurations in which wireless power transmitting device 10 is a wireless charging mat may sometimes be described herein as an example.

Power receiving device 40 may be a portable electronic device such as a wristwatch, a cellular telephone, a laptop computer, a tablet computer, or other electronic equipment. Power transmitting device 10 may be connected to a wall outlet (e.g., alternating current), may have a battery for supplying power, and/or may have another source of power. Power transmitting device 10 may have an AC-DC power converter such as power converter 14 for converting AC power from a wall outlet or other power source into DC power. DC power is used to power control circuitry 16. During operation, a controller in control circuitry 16 uses power transmitting circuitry 28 to transmit wireless power to power receiving circuitry 50 of device 40.

Power transmitting circuitry 28 has a transmitter such as transmitter 20. Transmitter 20 includes circuitry that produces alternating-current drive signals such as one or more oscillators 22. The frequency at which transmitter 20 supplies the alternating-current drive signals may be at microwave frequencies. For example, the frequency at which transmitter 20 supplies the alternating-current drive signals may be 1-5 GHz, 500 MHz to 5 GHz, about 2.4 GHz, at least 0.5 GHz (500 MHz), at least 1 GHz, at least 2 GHz, less than 3 GHz, less than 10 GHz, less than 100 GHz, less than 300 GHz, or other suitable frequency.

Oscillators 22 may produce output signals of adjustable magnitude and phase. Amplifier circuitry such as one or more corresponding amplifiers 24 (sometimes referred to as power amplifiers) amplify the drive signals produced by oscillators 22. The output of transmitter 20 is supplied to one or more antennas 26. In an illustrative embodiment, transmitter 20 may have N oscillators 22 and N corresponding power amplifiers 24, each of which receives the output of a respective one of oscillators 22 and each of which supplies a corresponding one of N drive signals at its output. The N drive signals supplied at the output of the N power amplifiers 24 may have phase and magnitude attributes that are independently adjustable by control circuitry 16. Each of the N drive signals is supplied to a respective one of N antennas 26. The value of N may be at least 2, at least 5, at least 10, at least 15, at least 20, less than 50, less than 30, less than 20, less than 13, less than 8, or other suitable number.

By supplying antennas 26 with alternating-current drive signals, antennas 26 each produce corresponding electromagnetic output signals 30 (e.g., radio-frequency electromagnetic signals such as microwave signals). These signals are near-field coupled to corresponding wireless power receiving components in device 40. For example, power receiving circuitry 50 may include a receiver such as receiver 52 with rectifier circuitry such as rectifier 54 coupled to one or more antennas such as antenna 56. With one arrangement, receiving circuitry 50 includes a single antenna 56.

When device 40 is resting on the charging surface of device 10, antenna 56 is near-field coupled to one or more of antennas 26 in device 10 (e.g., antenna 56 may be capacitively coupled to one or more antennas 26 that are partially or fully overlapped by antenna 56). Due to the electromagnetic coupling between antennas 26 and antenna 56, wireless power signals such as electromagnetic signals 30 that are transmitted by antennas 26 produce corresponding alternating-current signals in antenna 56. Rectifier 54 rectifies these received alternating-current signals and produces corresponding direct-current (DC) output voltages.

The DC voltages produced by rectifier 54 can be used in charging a battery such as battery 42 and can be used in powering other components in device 40. For example, device 40 may include input-output devices 44 such as a display, communications circuits, audio components, sensors, user input components such as buttons, microphones, touch and force sensors, and other components and these components may be powered by the DC voltages produced by rectifier 54 (and/or DC voltages produced by battery 42).

Device 10 and/or device 40 may communicate wirelessly. Device 10 may, for example, have wireless transceiver circuitry 18 that wirelessly transmits wireless communications signals such as Bluetooth® signals or other wireless data to device 40 using an antenna (e.g., an antenna in circuitry 18 that is separate from antennas 26). Wireless transceiver circuitry 18 may be used to wirelessly receive Bluetooth® signals or other wireless data signals that have been transmitted from device 40 using the antenna.

Device 40 may have wireless transceiver circuitry 48 that transmits wireless signals (e.g., Bluetooth® signals) to device 10 using an antenna. Receiver circuitry in wireless transceiver 48 may use this antenna to receive transmitted wireless communications signals (e.g., Bluetooth® wireless data) from device 12. The antenna of transceiver 48 may be separate from antenna 56 or antenna 56 may be used both in receiving transmitted wireless communications data and in receiving wireless power signals.

Figure 2:
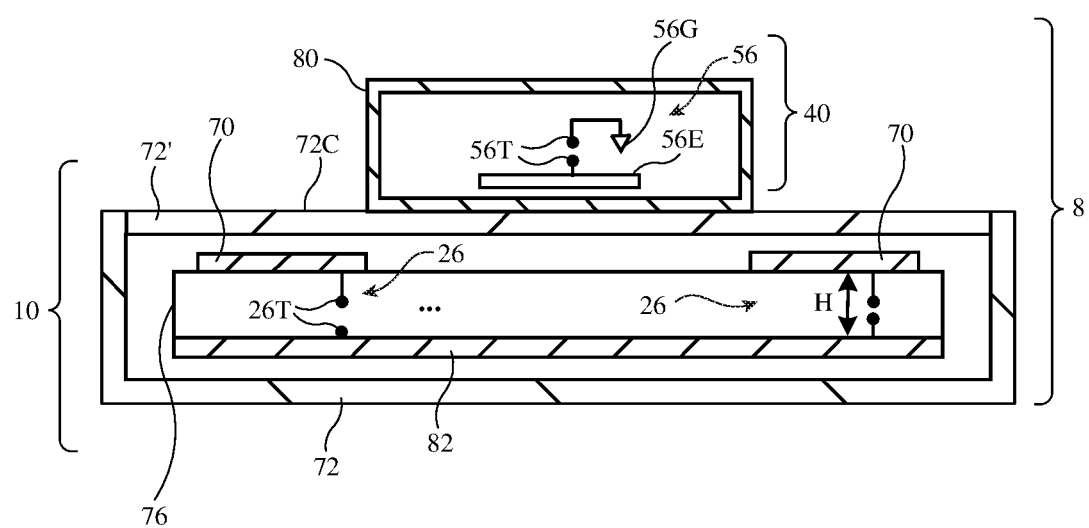
FIG. 2 is a cross-sectional side view of an illustrative wireless power transmitting device and a corresponding wireless power receiving device in accordance with an embodiment.

FIG. 2 is a cross-sectional side view of system 8 in an illustrative configuration in which wireless power transmitting device 10 is transmitting wireless power to a single corresponding wireless power receiving device 40. If desired, multiple wireless power receiving devices 40 may simultaneously receive power from device 10.

As shown in FIG. 2, device 10 may include multiple wireless power transmitting antennas 26. Each antenna 26 may be formed from a respective antenna resonating element 70 such as a patch antenna resonating element (e.g., antennas 26 may be patch antennas) and a shared antenna ground 82. Each antenna 26 may have a feed formed from terminals 26T. The terminals 26T of each antenna 26 are coupled to the output of a corresponding amplifier 24 (FIG.

1). In some configurations, antennas 26 may be antennas other than patch antennas (e.g., inverted-F antennas, loop antennas, slot antennas, etc.). Antenna resonating elements 70 (e.g., patch antenna resonating elements) may sometimes be referred to as electrodes, patches, or metal plates. Elements 70 can be formed from metal foil, metal traces on printed circuits or dielectric carriers, or other conductive structures.

Device 10 of FIG. 2 includes housing 72. Housing 72 may include conductive materials such as metal, and dielectric materials (e.g., polymer, glass, ceramic, etc.). Upper portion 72' (e.g., a planar cover member) overlaps antennas 26 (e.g., resonating elements 70) and forms charging surface 72C. One or more devices such as device 40 rest on charging surface 72C during wireless power transfer operations.

Portion 72' of housing 12 is formed from a dielectric such as a polymer, glass, or ceramic to allow signals 30 to pass from antennas 70 to power receiving circuitry 50 in device 40 such as power receiving antenna 56. Power receiving antenna 56 includes power receiving antenna resonating element 56E (e.g., a patch antenna element, slot antenna element, or other antenna resonating element). Antenna resonating element 56E and ground 56G form wireless power receiving antenna 56. During operation, wireless signals are received by antenna 56 through portion 72'. Alternating-current signals received with antenna 56 are supplied to rectifier 54 (FIG. 1) via antenna feed terminals such as antenna terminals 56T. Device 40 has a housing such as housing 80 (e.g., a housing formed from metal, glass, polymer, and/or ceramic, etc.). Antenna 56 may be formed from a conductive portion of housing 80, from metal traces on a dielectric substrate (e.g., a printed circuit, plastic carrier, glass member, dielectric housing structures, etc.), or from other conductive structures. If desired, portions of housing 80 may be formed from dielectric to allow signals to pass through housing 80 to antenna 56.

Antenna resonating elements 70 in device 10 are formed from conductive structures such as metal traces that have been patterned onto a substrate such as substrate 76. In an embodiment, the metal traces form a set of rectangular metal patches (e.g., antenna resonating elements 70 are patch antenna resonating elements and antennas 56 are patch antennas). Other configurations may be used for antenna resonating elements 70, if desired.

Substrate 76 is a dielectric substrate with one or more layers (e.g., a flexible printed circuit formed from a sheet of flexible polymer material such as a layer of polyimide or other flexible polymer layer, a rigid printed circuit substrate formed from a material such as fiberglass-filled epoxy, a plastic carrier, a glass layer, etc.). Ground plane 82 is formed from a planar layer of metal traces (e.g., a ground plane layer in printed circuit 76 that is separated by a height H from the metal traces forming antenna resonating elements 70).

The value of height H and other attributes of antennas 26 such as the shape and dimensions of antenna resonating elements 70 are configured so that the free-space efficiency of antennas 26 (e.g., the efficiency of each antenna 26 when device 40 and antenna 56 are not present) is less than a small upper threshold value Effmax. The value of Effmax may, as an example, be reduced by configuring antenna resonating elements 70 to have an elongated shape (e.g., an elongated rectangular shape with small width that does not support fringing fields with the ground of the antenna). The value of Effmax may be 1%, 2%, 5%, 0.1-4%, at least 0.3%, at least 0.05%, less than 10%, or other suitable low value. When device 40 lies on charging surface 72C so that antenna resonating element 56E of antenna 56 overlaps one or more of antennas 26 (e.g., one or more of antenna resonating elements 70), the efficiency of the overlapped antennas 26 increases significantly (e.g., to at least 10%, to at least 20%, at least 50%, at least 70%, at least 80%, at least 90%, at least 95%, less than 99.99%, less than 99%, or other suitable amount). Efficiency increases by a factor of at least 2, at least 3, at least 5, at least 10, at least 30, or other suitable value when antenna 56 is present.

As a result, device 10 will not radiate significant wireless power as signals 30 in the absence of device 40. When device 40 and antenna 56 are present (e.g., when antenna resonating element 56E overlaps one or more elements 70 in one or more respective antennas 26 and is capacitively coupled to those elements), the overlapped antennas 26 will be near-field coupled (e.g., capacitively coupled) to antenna 56 and will allow efficient transmission of wireless power from device 10 to device 40. When device 40 is not present, however, the efficiency of antennas 26 will drop sufficiently to prevent significant power from being wirelessly transmitted. In some configurations, control circuitry 16 may measure the impedance of each of antennas 26 (e.g., the amount of near-field coupling of each of antennas 26 to antenna 56) and to use this measured impedance information in adjusting the drive signals supplied to antennas 26 using transmitter 20. If, as an example, a given antenna 26 is not coupled to any receiving device antennas, no drive signals may be provided to that antenna. Control circuitry 16 can also adjust the drive signals applied to each antenna 26 based on feedback from device 40 (e.g., information on power transfer efficiency between device 10 and device 40 that is gathered using feedback from device 40). Feedback information can be used in real time to make adjustments to the signals supplied to antennas 26 to enhance power transfer efficiency.

Figure 3:
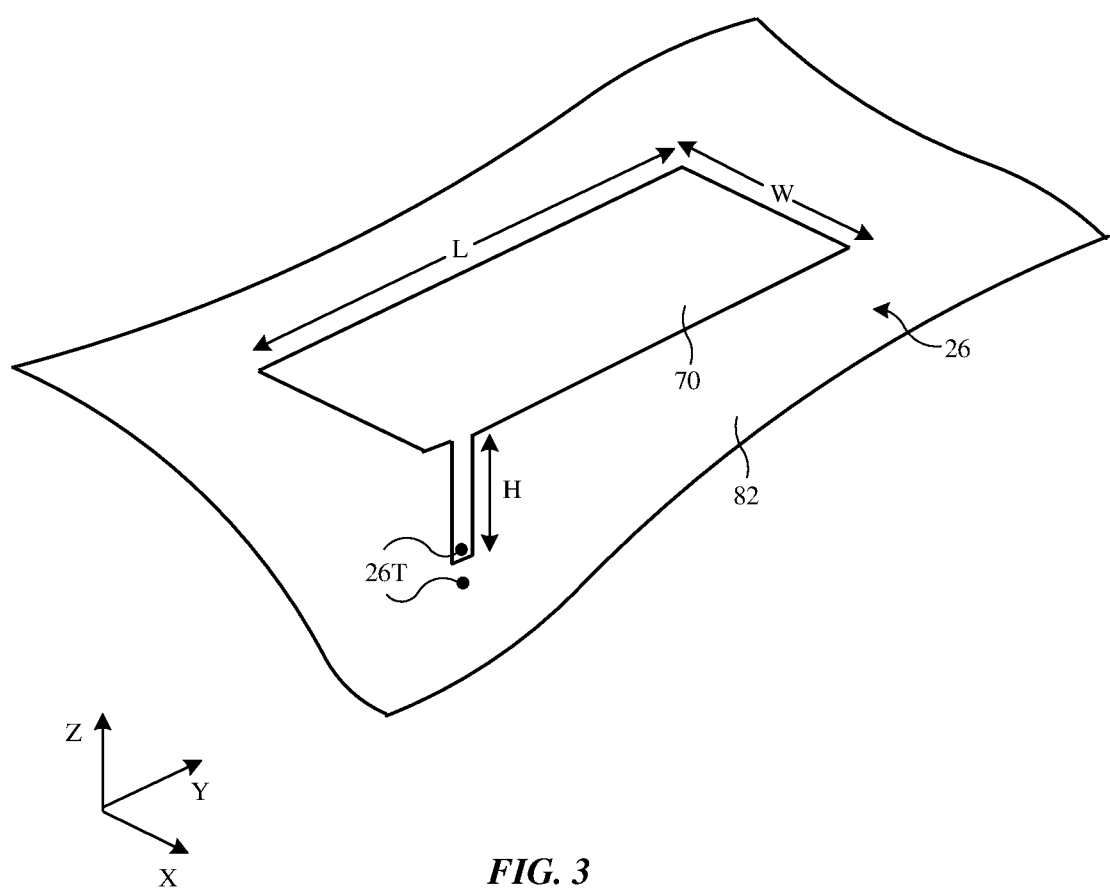
FIG. 3 is a perspective view of an illustrative wireless power transmitting device patch antenna in accordance with an embodiment.

A perspective view of an illustrative patch antenna configuration for antenna 26 is shown in FIG. 3. As shown in FIG. 3, antenna resonating element 70 is located a distance (height) H from antenna ground 82. Antenna terminals 26T form an antenna feed for antenna 26. Antenna resonating element 70 of FIG. 3 has a rectangular shape characterized by a length L and width W. Other shapes (circular, oval, square, hexagonal, etc.) may be used for forming patch antenna resonating elements, if desired. Length L may be at least 2 times greater than width W or at least 3 or 5 times longer than width W (as examples). This configuration (a narrow width arrangement) helps reduce fringing fields and therefore reduces free-space antenna efficiency so that wireless emissions are low when device 40 is not present. With an illustrative arrangement, length L is 40 mm (e.g., at least 25 mm, at least 35 mm, less than 50 mm, less than 65 mm, etc.) and width W is 12 mm (e.g. at least 5 mm, at least 8 mm, at least 10 mm, less than 15 mm, less than 18 mm, less than 25 mm, etc.). Height H may be about 0.01-10 mm, at least 0.05 mm, at least 0.1 mm, at least 0.5 mm, less than 6 mm, less than 4 mm, less than 2 mm, etc.). The aspect ratio of element 70 (L/W) is about 3.3, at least 2, at least 3, less than 3.5, less than 4, 1.5-5, or other suitable length-to-width value.

Figure 4:
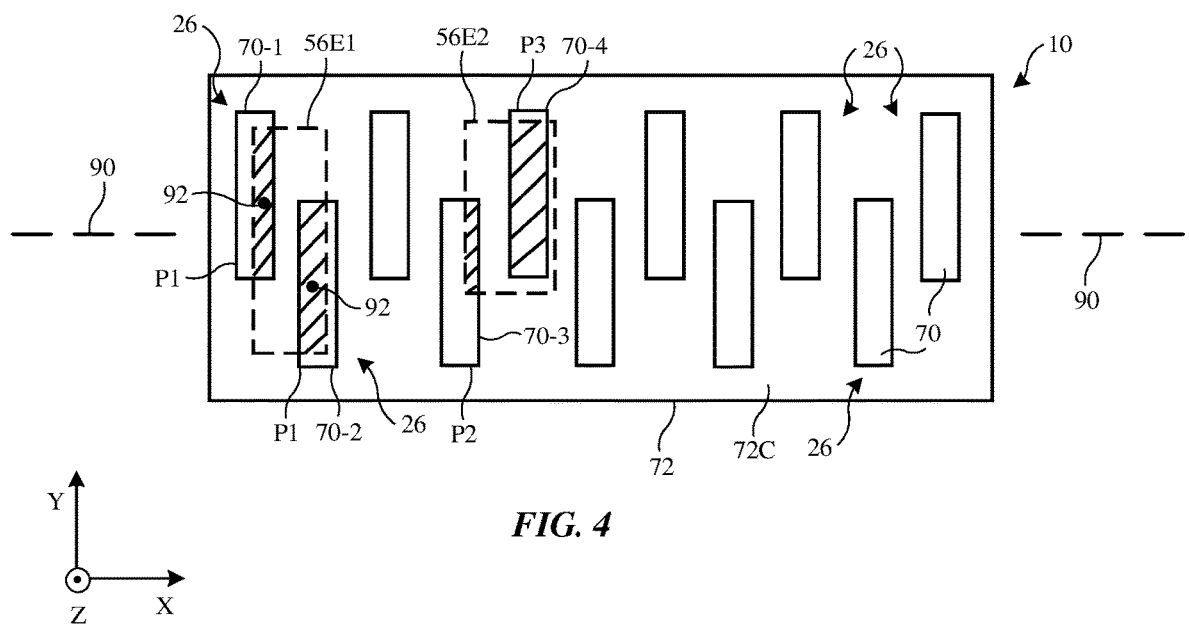
FIG. 4 is a top view of an illustrative wireless power transmitting device in accordance with an embodiment.

To provide satisfactory coverage for a variety of wireless power receiving devices on charging surface 72C, multiple antenna resonating elements 70 (multiple antennas 26) may be formed across surface 72C. As shown in FIG. 4, for example, charging surface 72C may have an elongated shape (rectangular, oval, rectangular with curved corners, etc.) and may be characterized by longitudinal axis 90. Antenna resonating elements 70 may be arranged in a row along the length of device 10 (e.g., a single staggered row). Configurations, which elements 70 are arranged in multiple staggered rows (e.g., to form a checkerboard of elements 70), or in which elements 70 are arranged in one or more unstaggered rows or other patterns may also be used, if desired.

In the arrangement of FIG. 4, elements 70 are spaced evenly along the length of surface 72C (e.g., along longitudinal axis 90, parallel to the X axis of FIG. 4). To widen the coverage (along axis Y) of antennas 26 without increasing the number of antennas 26 that are used, the positions of elements 70 relative to axis Y are staggered. Alternating odd and even resonating elements 70 may, for example, be placed so that their centers 92 lie respectively above or below axis 90 (on opposing sides of axis 90), which bisects surface 72C. By alternating the placement of resonating elements 70 in this way, relatively large lateral coverage (along axis Y) can be achieved without increasing the number of power amplifiers and resonating elements 70 that are used for a given surface area of charging surface 72C. The resonating element pattern of FIG. 4 also helps ensure satisfactory near-field coupling between device 10 (elements 70) and a variety of different wireless power receiving devices 40 (e.g., antennas in tablets, cellular telephones, watches, stylus devices, earbuds, earbud cases, etc.).

To enhance wireless power transmission efficiency, control circuitry 16 adjusts the drive signal supplied to each of antennas 26 (e.g., by adjusting drive signal phase and/or magnitude using oscillators 22 and/or amplifiers 24 of transmitter 20). Control circuitry 16 may, as an example, only transmit power using resonating elements 70 that are coupled to a wireless power receiving device antenna. Coupling can be measured using measurement circuitry in control circuitry 16 (e.g., impedance measurement circuitry that determines whether the impedance of each antenna 26 has been perturbed by an overlapping antenna element 56E, reflected power measurement circuitry that measures how much transmitted power is reflected back from a given antenna when power is provided to that antenna, etc.), using feedback data transmitted wirelessly from device 40 to device 10 (e.g., using transceiver circuitry 48 and transceiver circuitry 18), using sensors that detect overlapping objects such as devices 40 (e.g., electromagnetic sensors, optical sensors, etc.), and/or using other suitable circuitry that measures capacitive coupling between each of elements 70 and elements 56E on charging surface 72C. In some configurations, bidirectional wireless communications between device 10 and device 40 may be used to establish the type of power receiving device 40 that is present on device 10 and associated wireless power transmission settings to use in transmitting wireless power.

Consider, as a first example, a scenario in which a wireless power receiving device has an antenna with a resonating element (resonating element 56E1) that evenly overlaps parts of first element 70-1 and second element 70-2. In this situation, control circuitry 16 will transmit wireless power using overlapped elements 70-1 and 70-2, while the remaining elements 70 under surface 72C are unpowered. To help enhance wireless power transmission efficiency in this scenario, control circuitry 16 can transmit wireless power by applying drive signals of equal magnitude and identical phase P1 (within 1%, 2%, 10%, or other small threshold variation).

As a second example, consider a scenario in which a wireless power receiving device antenna has a resonating element (resonating element 56E2) that unevenly overlaps elements 70-3 and 70-4. Element 70-4 may, as an example, be overlapped more than element 70-3. To help enhance wireless power transmission efficiency the phase and/or magnitude of the drive signals applied to elements 70-3 and 70-4 with transmitter 20 may be different. As an example, the drive signal applied by control circuitry 16 to element 70-3 may have a first phase P2 and the drive signal applied by control circuitry 16 to element 70-4 may have a second phase P3 that is different than P2.

Figure 5:
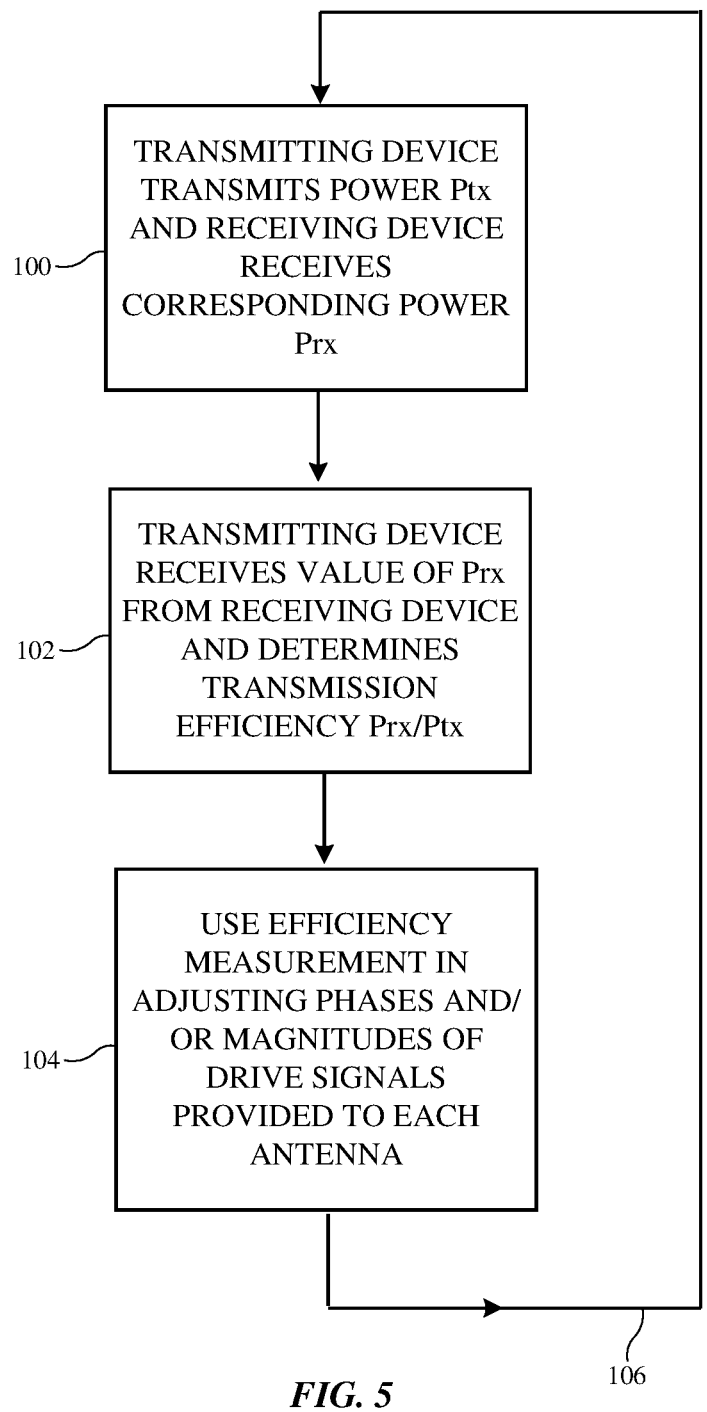
FIG. 5 is a flow chart of illustrative operations involved in operating a wireless power system of the type shown in FIG. 1 in accordance with an embodiment.

The drive signals (phase and/or magnitude, etc.) applied to each element 70 can be adjusted in real time based on feedback from device 40 to help enhance wireless power transmission efficiency. A flow chart of illustrative operations involved in enhancing wireless power transmission efficiency using feedback information is shown in FIG. 5.

During the operations of block 100, transmitting device 10 uses power transmitting circuitry 28 to transmit wireless power Ptx to wireless power receiving device 40. Wireless power receiving device 40 receives corresponding power Prx with wireless power receiving circuitry 50. The amount of power that is received for a given transmitted power is influenced by factors such as the configurations of antennas 26 and 56, the physical location of device 40 on charging surface 72, and the drive signals applied to the antennas in device 10.

During the operations of block 102, control circuitry 46 of device 40 uses wireless communications circuitry such as transceiver 48 (e.g., a radio-frequency transceiver such as a Bluetooth® transceiver or other suitable wireless communications circuit) to transmit feedback to device 10. In particular, transceiver 48 may be used in transmitting information to corresponding wireless transceiver circuitry 18 of device 10 on the value of received power Prx. Control circuitry 16 of device 10 uses the values of Ptx and Prx to determine the current power transmission efficiency Ptx/Prx. Power transmission efficiency measurements can be gathered while device 10 is transmitting wireless power using multiple antennas 26 (e.g., using first and second elements 70 that are coupled to element 56E). The drive signals applied to each active element 70 can be selected based on coupling measurements (e.g., impedance measurements made with control circuitry 16) and/or the feedback from device 40.

During the operations of block 104, device 10 uses control circuitry 16 adjust the drive signals (e.g., drive signal phase and/or magnitude) to each element 70 (e.g., each element 70 coupled to element 56E). Adjustments to drive signals can be made to enhance to wireless power transmission efficiency. In some arrangement, test sample adjustments (adjustments made to gather testing information) can be made to drive signals to help device 10 evaluate wireless power transmission efficiency over a range of possible drive conditions. Device 10 may, for example, increase or decrease phase P2 relative to phase P3 momentarily to evaluate whether phase P2 is currently too low or too high. As shown by line 106, which indicates how processing may loop back to the operations of block 100, the process of adjusting the drive signal to each antenna in device 10 and evaluating the resulting wireless power transmission efficiency (Prx/Ptx) that is achieved may be performed continuously during wireless power transmission operations.

Figure 6:
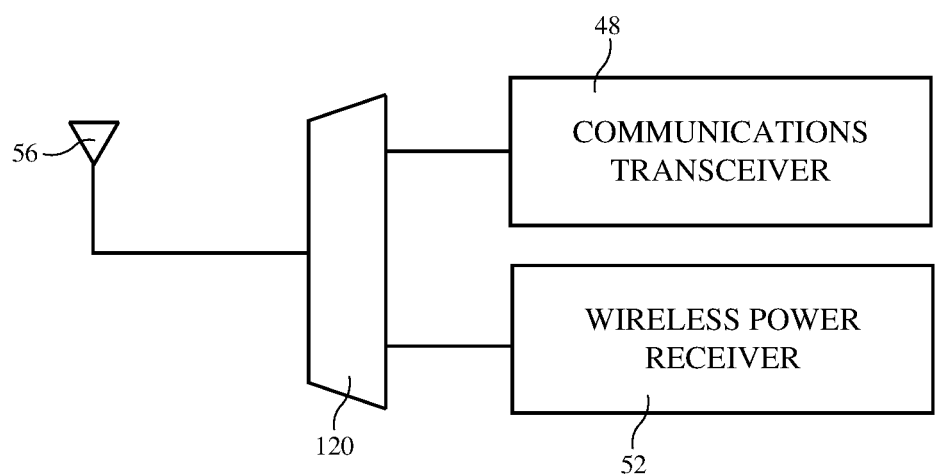
FIG. 6 is a diagram showing illustrative multiplexing circuitry that may be incorporated into a wireless power receiving device to allow an antenna to be shared between communications circuitry and wireless power circuitry in accordance with an embodiment.

In some arrangements for device 40, wireless power and wireless communications are handled using separate respective antennas. In other configurations, all or part of a wireless power receiving antenna can be shared with all or part of a wireless communications antenna. As shown in the illustrative arrangement of FIG. 6, for example, antenna 56 can be shared between communications transceiver 48 and wireless power receiver 52 using multiplexing circuitry 120.

Figure 7:
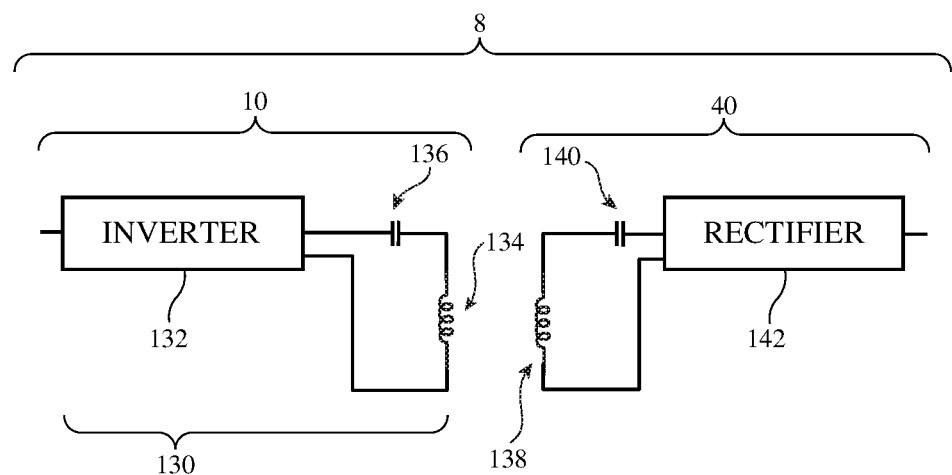
FIG. 7 is a circuit diagram of illustrative inductive wireless power circuitry of the type that can be used in the system of FIG. 1 in accordance with an embodiment.

In an illustrative embodiment, system 8 includes inductive wireless power circuitry, as shown in FIG. 7. In this type of arrangement, device 10 has one or more inductive wireless power transmitting circuits such as circuit 130 each of which includes an inverter 132 for supply alternating-current drive signals to a corresponding resonant circuit formed from a wireless power transmitting coil 134 and one or more associated capacitors such as illustrative capacitor 136. This produces alternating-current electromagnetic signals (e.g., magnetic fields) that are received by any overlapping (magnetically coupled) inductive wireless power receiving devices 40. Devices 40 that receive wireless power from coil 134 have corresponding wireless power receiving coils such as coil 138 of FIG. 7 in a resonant circuit that includes one or more capacitors such as capacitor 140. Rectifier circuitry such as rectifier 142 is coupled to each resonant circuit (e.g., each wireless power receiving coil 138 and capacitor(s) 140). During operation, wireless power is transmitted using coil 134 and received by coil 138 at inductive wireless power transmission frequencies (e.g., 50 kHz to 500 kHz, at least 100 kHz, at least 200 kHz, less than 10 MHz, less than 1 MHz, less than 400 kHz, or other suitable inductive wireless power transmission frequencies).

By incorporating both inductive wireless power transmitting coils 134 and wireless power transmitting antennas 26 into device 10, device 10 can support wireless charging with wireless power receiving devices that support only inductive charging, wireless power receiving devices that support wireless charging only using antennas 26 (e.g., capacitive coupling arrangements), and wireless power receiving devices that include one or more power receiving coils 138 in addition to one or more antennas 56.

Figure 8:
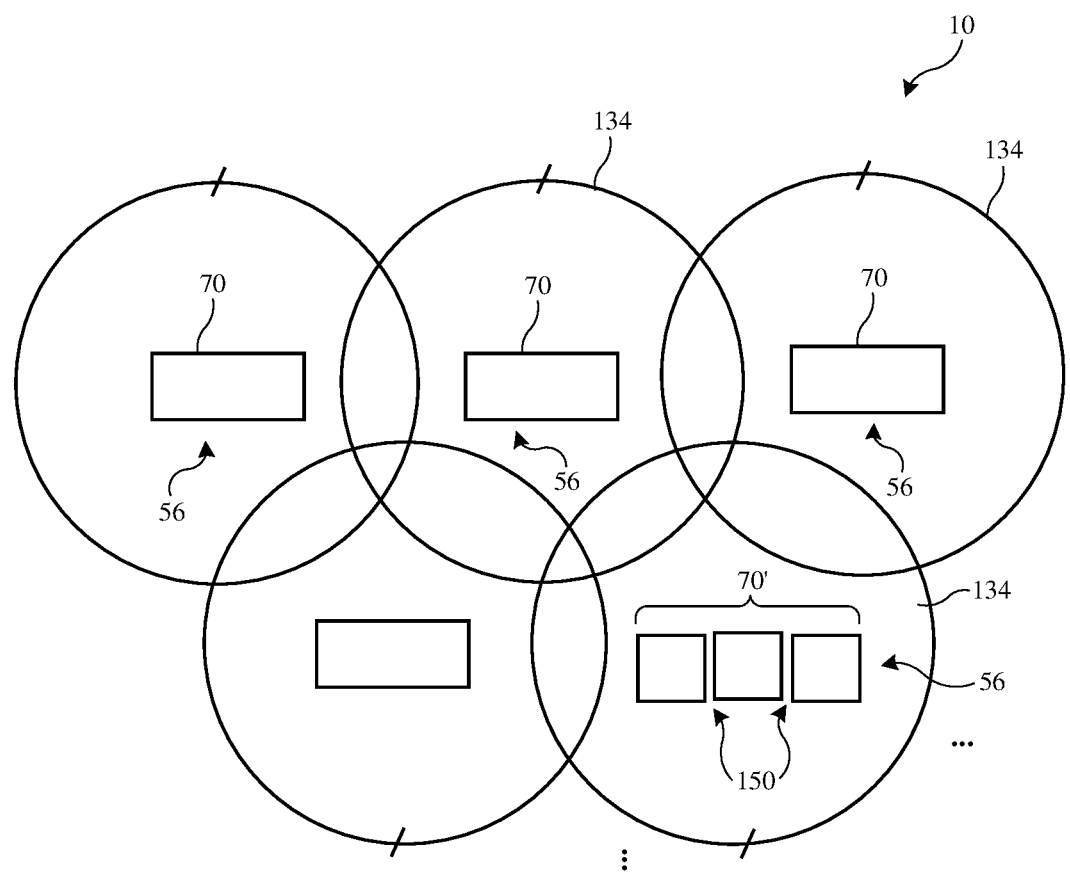
FIG. 8 is a top view of a portion of a wireless power transmitting device having an array of microwave antenna elements and an array of inductive wireless power transmitting coils in accordance with an embodiment.

FIG. 8 is a top view of device 10 in an illustrative configuration in which both inductive wireless power transmitting coils 134 and antennas 56 with antenna resonating elements 70 have been incorporate into device 10. As shown in FIG. 8, antenna resonating elements 70 can be placed in the centers of coils 134 so that each element 70 is surrounded by the loops of conductive lines (wires, metal traces, etc.) of a respective one of coils 134. To help reduce eddy currents during inductive wireless power transmission operations, antenna resonating elements 70 can be formed from thin metal (e.g., metal traces with a thickness of less than 1 micron, less than 0.5 microns, less than 0.2 microns, less than 0.1 microns, less than 0.05 microns, at least 0.01 microns, or other suitable thickness) and/or can have slots 150 that pass partway through or fully through elements 70 (see, e.g., element 70'). At lower frequencies such as those associated with inductive charging, slots 150 form open circuits (high impedance structures) and the presence of slots 150 disconnects regions of element 70' from each other, thereby blocking eddy current formation. At higher frequencies such as those associated with wireless power transfer using antennas 26 and 56, the capacitances associated with slots 150 are short circuits, effectively bridging slots 150 and electrically connecting all of the different portions of each element 70 together (e.g., all of the portions of element 70' of FIG. 8 are electrically shorted to each other). As a result, the portions of each element 70 that are separated by slots 150 will be electrically joined and will form an effective antenna resonating element 70 for a corresponding antenna 26.

The foregoing is merely illustrative and various modifications can be made to the described embodiments. The foregoing embodiments may be implemented individually or in any combination.

What is claimed is:

1. A wireless power transmitting device configured to transmit wireless power to a wireless power receiving device through a charging surface, comprising:
   a plurality of wireless power transmitting antennas having respective patch antenna resonating elements, wherein the charging surface is characterized by a longitudinal axis and wherein the patch antenna resonating elements are arranged in a staggered configuration along the longitudinal axis; and
   a transmitter configured to supply alternating-current drive signals to the plurality of wireless power transmitting antennas to transmit the wireless power.

2. The wireless power transmitting device of claim 1 wherein the transmitter comprises an oscillator configured to supply the alternating-current drive signals at a frequency of 500 MHz to 5 GHz.

3. The wireless power transmitting device of claim 1 wherein the patch antenna resonating elements are rectangular patch antenna resonating elements and wherein the rectangular patch antenna resonating elements have centers alternately located on opposing first and second sides of the longitudinal axis.

4. The wireless power transmitting device of claim 1 wherein the patch antenna resonating elements are rectangular patch antenna resonating elements and wherein each rectangular patch antenna resonating element is elongated along a dimension perpendicular to the longitudinal axis.

5. The wireless power transmitting device of claim 1 wherein the patch antenna resonating elements are rectangular patch antenna resonating elements, wherein each rectangular patch antenna resonating element is elongated along a dimension perpendicular to the longitudinal axis, wherein the rectangular patch antenna resonating elements have centers alternately located on opposing first and second sides of the longitudinal axis, and wherein each rectangular patch antenna resonating element has a width and a length that is at least two times the width.

6. The wireless power transmitting device of claim 1 further comprising inductive wireless charging coils.

7. The wireless power transmitting device of claim 1 further comprising:
   a plurality of inverters; and
   a plurality of inductive wireless power transmitting coils each coupled to a respective one of the inverters.

8. The wireless power transmitting device of claim 1 further comprising:
   a plurality of inductive wireless power transmitting coils, each surrounding a respective one of the patch antenna resonating elements.

9. The wireless power transmitting device of claim 1 further comprising inductive wireless charging coils, wherein each of the patch antenna resonating elements lies within a respective one of the inductive wireless charging coils and wherein each of the patch antenna resonating elements includes at least one slot.

10. The wireless power transmitting device of claim 1 wherein each of the patch antenna resonating elements is configured to transmit wireless power with an efficiency of less than 5% when the wireless power receiving device is not overlapping that patch antenna resonating element and is configured to transmit wireless power with an efficiency of at least 10% when the wireless power device is overlapping that patch antenna resonating element.

11. The wireless power transmitting device of claim 1 further comprising:
control circuitry configured to:
supply a first drive signal to a first of the patch antenna resonating elements and a second drive signal to a second of the patch antenna resonating elements;
receive wireless feedback information from the wireless power receiving device; and
in response to the wireless feedback information, adjust the first and second drive signals.

12. The wireless power transmitting device of claim 11 wherein the first and second drive signals have different phases and wherein the wireless feedback information comprises information on an amount of power wirelessly received at the wireless power receiving device while the wireless power is transmitted by the transmitter.

13. The wireless power transmitting device of claim 1 further comprising:
control circuitry configured to adjust phases of drive signals applied respectively to a first of the patch antenna resonating elements and a second of the patch antenna resonating elements based on wirelessly received information from the wireless power receiving device.

14. A wireless power transmitting device configured to transmit wireless power to a wireless power receiving device through a charging surface, comprising:
a row of microwave antennas extending along an axis that runs parallel to the charging surface, wherein each microwave antenna has a corresponding patch antenna resonating element with a center, and wherein the microwave antennas extending along the axis have the centers of their patch antenna resonating elements on alternating sides of the axis; and
power transmitting circuitry coupled to the row of microwave antennas.

15. The wireless power transmitting device of claim 14 wherein the power transmitting circuitry is configured to provide a first drive signal to a first of the microwave antennas overlapped by a wireless power receiving antenna element in the wireless power receiving device and is configured to provide a second drive signal of a different phase than the first drive signal to a second of the microwave antennas overlapped by the wireless power receiving antenna element in the wireless power receiving device.

16. The wireless power transmitting device of claim 14 wherein each of the patch antenna resonating elements has a rectangular shape with a width and a length of at least two times the width that extends along a dimension perpendicular to the axis.

17. The wireless power transmitting device of claim 14 further comprising:
an inverter configured to supply an alternating-current signal; and
a wireless power transmission coil coupled to the inverter that receives the alternating-current signal and provides corresponding wireless power signals to the wireless power receiving device.

18. The wireless power transmitting device of claim 17 wherein at least one of the patch antenna resonating elements has at least one slot configured to reduce eddy currents when the alternating-current signal is received by the wireless power transmission coil.

19. A wireless power transmitting device configured to transmit wireless power to a wireless power receiving antenna in a wireless power receiving device, comprising:
a row of patch antenna resonating elements including first and second patch antenna resonating elements near-field-coupled to the wireless power receiving antenna;
a first amplifier coupled to the first patch antenna resonating element and a second amplifier coupled to the second patch antenna resonating element;
a first oscillator coupled to the first amplifier and a second oscillator coupled to the second amplifier; and
control circuitry configured to use the first oscillator and the first amplifier to provide a first drive signal to the first patch antenna resonating element and configured to use the second oscillator and the second amplifier to provide a second drive signal to the second patch antenna resonating element with a different phase than the first drive signal.

20. The wireless power transmitting device of claim 19 wherein the patch antenna resonating elements extend in a staggered row along an axis and wherein each patch antenna resonating elements is elongated along a dimension that is perpendicular to the axis.

* * * * *